Oct. 14, 1952 R. G. HEYL, JR 2,613,986
UNITARY BODY FRAME CONSTRUCTION
Filed July 26, 1950 2 SHEETS—SHEET 1

Inventor
Russell G. Heyl Jr.
By Willits, Helwig & Baillio
Attorneys

Oct. 14, 1952 R. G. HEYL, JR 2,613,986
UNITARY BODY FRAME CONSTRUCTION
Filed July 26, 1950 2 SHEETS—SHEET 2
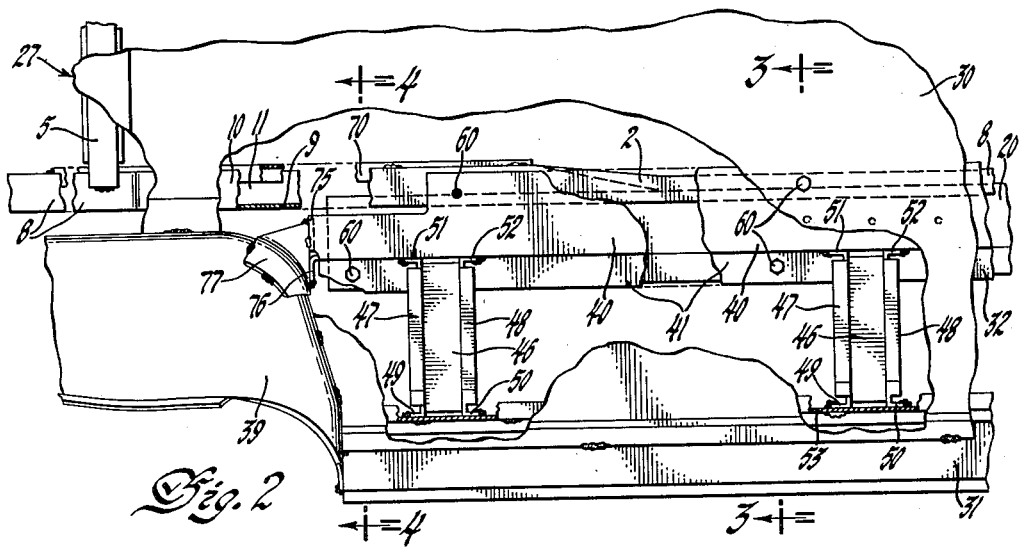
Fig. 2
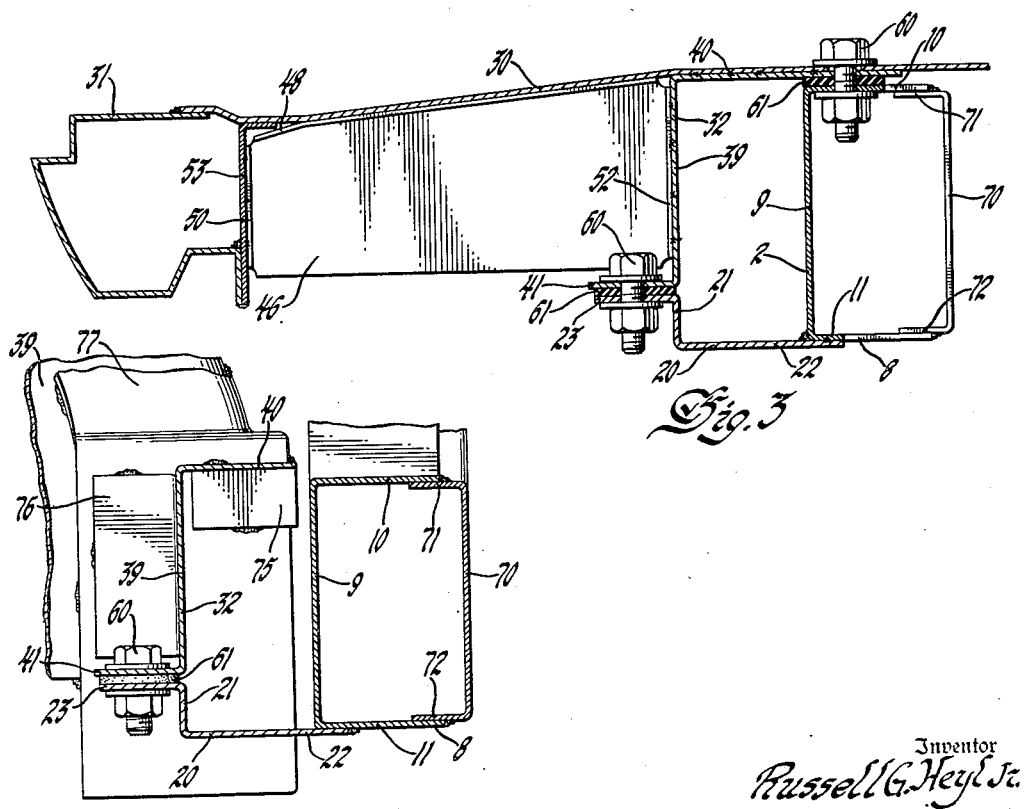
Fig. 3
Fig. 4
Inventor
Russell G. Heyl Jr.
By Willits, Helwig & Baillie
Attorneys Patented Oct. 14, 1952

2,613,986

UNITED STATES PATENT OFFICE 2,613,986

UNITARY BODY FRAME CONSTRUCTION

Russell G. Heyl, Jr., Birmingham, Mich., assignor to General Motors Corporation, Detroit, Mich., a corporation of Delaware Application July 26, 1950, Serial No. 176,010

10 Claims. (Cl. 296—28)

1

This invention relates to automotive vehicles and particularly to unitary body frame constructions therefor.

As the present trend of automobile design progresses toward lower profiles, it has become an increasingly difficult problem to maintain sufficient head room without sacrifice of rigidity. One approach toward solving this problem has been to integrate the body and chassis into one homogeneous rigid structure. However, certain complications from a production standpoint arise in such designs, particularly where various chassis wheel base lengths and various body styles and sizes are desired to be used interchangeably. A further important disadvantage occurs where body manufacturing and assembly operations are carried out remote from the chassis manufacturing and assembly operations. Also in such integral constructions difficulty has been experienced in obtaining satisfactory painting of the enclosed chassis-body sill surfaces.

In addition, the sills in such proposed integral designs have been located adjacent the outer margins of the body where they are subject to collision damage. When so located, these sills have of necessity been relatively wide in transverse section with the result that a wide threshold at the door openings is obtained which is objectionable with the body floor recessed below the door threshold.

It is the principal object of this invention to provide an improved body and chassis sill construction of a "split" unitary type which avoids the above-mentioned disadvantages of prior structures, and which is designed for convenient assembly and disassembly and for shimming the body relative to the chassis in conventional manner without distortion.

In accordance with my invention I provide separate chassis and body sill structures which cooperate in assembly to provide a combined box section sill located substantially inboard from the sides of the body and adapted to be secured together by bolts. Further, the abutting surfaces of all bolted joints are disposed horizontally to accommodate vertical shimming of the body as necessary. The body and chassis sills each have a vertical web section which is spaced opposite the other in assembly, and each has upper and lower horizontal leg portions with the chassis sill leg portions arranged to underlie the body sill leg portions.

In the drawings:

Figure 2 is a fragmentary plan view of the chassis and body structures in assembled relation, with parts shown broken away and in section.

Figure 3 is a sectional view substantially on line 3—3 of Figure 2.

Figure 4 is a sectional view substantially on line 4—4 of Figure 2.

Figure 1:
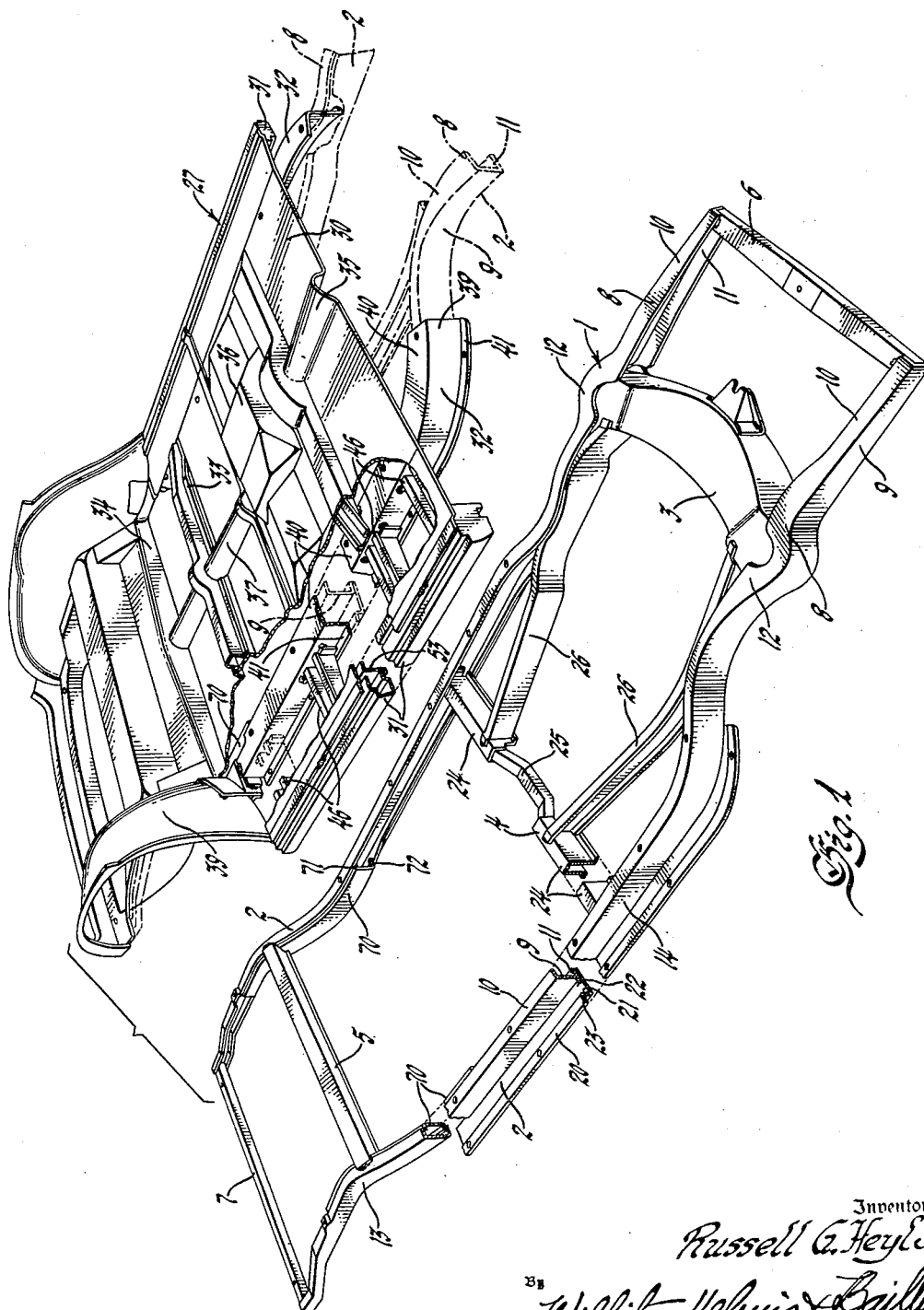
Figure 1 is an exploded view in perspective of a chassis frame structure and the lower part of the body structure which cooperate with each other in accordance with my invention.

Referring now to the drawings in detail, numeral 1 designates generally the chassis frame structure of an automotive vehicle having longitudinal side sills 2, front, intermediate and rear cross members 3, 4 and 5, and front and rear tie members 6 and 7. The sills 2 comprise inwardly presenting channel members 8 which extend the full bumper-to-bumper length of the vehicle and are tied together at their respective ends by the tie members 6 and 7. The longitudinal stiffness of these channel members may be varied as necessary by varying the depth of the channel web 9 and the upper and lower channel flanges or leg portions 10 and 11. As will be seen in Figure 1, the channel web 9 increases in depth from both the front and rear ends toward the region 12 of the front cross member 3, and the upper channel leg 10 is widened substantially in the region 12 of the front cross member 3. Both the upper and lower legs 10 and 11 are also of somewhat greater width in the rear wheel kickup region 13 than in the intermediate body sill supporting region 14.

Extending laterally outward from each channel member and longitudinally thereof from just forward of the rear wheel kickup to just rearward of the front cross member is a Z-section stiffener plate 20, the web 21 of which is disposed vertically and has an in-turned horizontal lower leg 22 underlying and welded to the lower leg 11 of the chassis sill channel 8. 23 indicates the out-turned horizontal upper leg of this stiffener plate.

Referring to Figure 1, the cross member 4 comprises two inverted channel section stubs 24 joined together at their inner ends by a bridge piece 25. This bridge piece serves as a removable rest or support for the rear end of the transmission (not shown) of the vehicle, and may be bolted for this purpose to the stubs 24. The stubs 24 are received by and welded at their outer ends to the chassis sill channels 8 and are further supported by bracing members 26. These bracing members are bowed in horizontal plane and are welded at their ends to the stubs 24 and the front cross member 3, and are welded intermediate their ends to the chassis sill channels 8.

The body frame structure is designated generally by the numeral 27 and comprises a floor panel 30, rocker panels 31 of conventional box section reinforcing the outer marginal edges of the floor panel, and a pair of spaced apart body sills 32 of Z-shaped section which are spaced well inboard of the rocker panels by outriggers 46. The body sills 32 are substantially coextensive in length with the stiffener plates 20, and the floor panel 30 extends rearwardly from approximately the front ends of the body sills 32 beyond the rear ends of these sills 32 and terminates opposite the rear tie member 7. The floor panel 30 may of course be embossed as necessary for strengthening purposes as at 33, 34, etc., and to provide clearance at 35, 36 and 37 for the transmission shaft, transmission and drive shaft, respectively.

The Z-section body sills 32 are coextensive in length with the chassis sill stiffener plates 20 and have vertical webs 39 with horizontal upper and lower legs 40 and 41 turned inwardly and outwardly of the body, respectively. The outriggers 46 are of upwardly presenting channel section and have the upper margins of their channel walls flanged outwardly as at 47 and 48. The floor panel 30 is welded to the body sill upper legs 40 and to the outrigger channel flanges 47 and 48. Also, the opposite ends of the outrigger channel walls are flanged outwardly as at 49, 50, 51 and 52, the inner end flanges 51 and 52 abutting and welded to the body sill webs 39 and the outer end flanges 49 and 50 abutting and welded to the inner wall 53 of the rocker panels 31. Thus the rocker panels, outriggers, body sills and floor panel form an integral structure for assembly to the chassis frame. Since the outriggers 46 are part of the body structure, chassis assembly operations and shipping of the chassis frames is facilitated.

At assembly the upper legs 40 of the body sills 32 rest on the chassis sill channel upper legs 10 and the body sill lower legs 41 rest on the upper legs 23 of the chassis sill stiffener plates 20. Aligned holes are provided for bolts 60 which serve to clamp the respective sill leg portions together, non-metallic shims 61 of rubber or other suitable material being inserted between the legs to insulate the respective sill structures against metal to metal contact and obtain the necessary spacing therebetween at each bolt. Prior to assembly, of course, the outer faces of the chassis sill channels 9 and the inner faces of the stiffener plate 20 and body sill 32 are painted or otherwise rust-proofed.

In the rear wheel kickup region the chassis sill channels 8 are closed to form box sections by means of outwardly presenting channel members 70, the upper and lower legs 71 and 72 thereof fitting within the chassis sill channels 8 and welded to their upper and lower legs 10 and 11. These reinforcing channels 70 somewhat overlap the body sills 32 at the rear ends of the sills 32 and the upper and lower legs 10 and 11 of the channels 8 are widened in the sections reinforced by the channels 70.

In the rear wheel kickup region 13 the floor panel 30 is reinforced by wheel housing panels 39 which attach at their forward ends to the rocker panels 31 and the body sills 32, and along their longitudinal lower edges to the floor panel 30 which in this region overlies and is bolted at final assembly to the chassis sills 2 and rear tie member 7. The attachment of these wheel housing panels to the body sills 32 is effected by welding to flanges 75 and 76 provided for the purpose at the rear ends of the body sill upper legs 40 and webs 39, respectively. Similar provision (not shown) for welded attachment to the rocker panels 31 may be employed. 77 is a stamping which serves to reinforce wheel housing panel 39 in the section which is welded to the body sill flanges 75 and 76.

The construction heretofore described accomplishes results not obtainable by prior structures, among which are that the bolting surfaces are all horizontal to accommodate body shimming as desired, the combined body and chassis sill members are considerably inboard from the rocker panels where they are largely invulnerable to collision damage, and the rocker panels may be made relatively narrow permitting the height of the floor inboard thereof to be lowered with a relatively narrow threshold. The nuts and bolts securing the complementary sill members together, while easily accessible for assembly and repair, are hidden from normal view externally of the vehicle. The sill sections which are bolted together are of heavy gauge metal permitting relatively few bolts, and the design accommodates the use of additional cross members or X members to be added where necessary by the body structure for further stiffening of the combined underbody and chassis structure, such as might be desired for example with bodies of the convertible or open top type. Such additional bracing (not shown) would interconnect the chassis sills 2 independently of the body sills 32 and floor panel 30 and therefore not complicate the underbody design.

It should also be noted that the channels 70, Z-section body sills 32, and the relation of stubs 24 and bracing members 26 all provide added strength for the chassis sill channels 8 in the regions 12, 13 and 14, respectively.

I claim:

1. In a vehicle construction; a body structure including a pair of laterally spaced longitudinal body sills each of generally Z-shape section having an upper leg extending inwardly and a lower leg extending outwardly, a rocker panel spaced laterally outward of each sill, a plurality of outriggers interconnecting each sill and its adjacent rocker panel, and a body floor panel overlying and integrally secured to the sills, rocker panels and outriggers; and a chassis structure including a pair of laterally spaced longitudinal sills each comprising an inwardly presenting channel member and a stiffener member of generally Z-shape section having its lower leg underlying and integrally secured to the lower leg of the channel member; said stiffener plate having the web of its Z-section spaced laterally outward of the channel member web; the upper and lower legs of the body sill Z-sections overlying and removably bolted to the upper legs of the channel member and stiffener plate Z-section, respectively.

2. In a vehicle construction, a chassis side sill including an inwardly presenting channel section member, and an outwardly extending stiffener plate welded to the lower leg of said channel, a body sill member of Z-section cooperating with said chassis side sill to form a closed box section sill with the web of the Z-section in spaced parallel relation with the web of said channel, the upper leg of said Z-section overlying the upper leg of said channel and the lower leg of said Z-section overlying the outer margin of said stiffener plate, and fastening means removably securing said upper and lower legs of the Z-section to the channel upper leg and stiffener plate, respectively.

3. In a vehicle construction, a chassis sill member of inwardly presenting channel section, a body sill member of Z-section having a vertical web, the upper leg of said Z-section overlying and removably bolted to the upper leg of said channel section, and a plate underlying both the lower leg of said channel section and the lower leg of said Z-section, said plate being welded to said channel section lower leg and removably bolted to said Z-section lower leg.

4. In a vehicle construction, a body structure including a floor panel and a pair of laterally spaced apart longitudinally extending body sills, said body sills each being Z-shaped in section with its web vertical and its upper leg turned toward the opposite body sill, said floor panel being welded to the upper legs of the respective body sills, and a chassis structure including a pair of chassis sills cooperating with said body sills to form box section sills, said chassis sills each comprising an inwardly presenting channel member having its upper leg underlying and bolted to the upper leg of the adjacent body sill and a stiffener plate welded to the lower leg of the channel member, said body sill having its lower leg bolted to the stiffener plate and its web spaced from the web of the channel member, said channel members continuing rearwardly beyond the limits of the body sills and stiffener plates to the rear end of the vehicle, and outwardly presenting channel members received by and forming box section sills with the channel members rearwardly of the body sills.

5. In a vehicle construction, a separate chassis structure including a chassis sill, and a separate body structure including a body sill adapted to cooperate with the chassis sill in forming a combined sill of box-shape section, said chassis sill including an inwardly presenting channel member extending the full bumper-to-bumper length of the vehicle, a stiffener plate coextensive with the body sill and welded to the lower leg of the channel member, and an outwardly presenting channel member cooperating with the inwardly presenting channel to form a continuation of the box section rearwardly of the body sill, said body sill consisting of a Z-section member having a vertical web, an inwardly turned upper leg and an outwardly turned lower leg, said body sill upper leg resting on and being bolted to the channel upper leg, and said body sill lower leg resting on and being bolted to the stiffener plate.

6. In a split-type box-section sill structure for an automotive vehicle, a chassis part and a body part, each of said parts having a vertical wall portion spaced inboard from the adjacent side of the body and two integrally associated horizontal leg portions extending inwardly and outwardly from the upper and lower margins respectively of said vertical wall portion, said body part leg portions resting on and removably clamped to said chassis part leg portions, and said wall portions being spaced apart when the sill structure is assembled.

7. In a split-type box-section sill structure for an automotive vehicle, a chassis part and a body part, one of said parts comprising a channel member having a vertical web forming one side of the box section, a stiffener plate welded to one of the channel legs and forming an adjacent side of the box section, the other of said parts being Z-shape in section with the web and one leg of the Z forming sides of the box-section opposite said channel web and stiffener plate respectively, said one leg of the Z and the other leg of the channel being in overlapping relation and provided with aligned holes, the stiffener plate and the other leg of the Z being in overlapping relation and provided with aligned holes, and fastening means in said holes releasably clamping the chassis and body parts together.

8. In a vehicle construction, a body including longitudinal body sills spaced inboard from the lateral side planes of the body, said body sills being Z-shaped in transverse section with the web of the Z extending vertically and the upper and lower legs of the Z extending inwardly and outwardly of the body, and a chassis including longitudinal chassis sills inwardly adjacent the body sills, said chassis in transverse section including a vertical web portion in spaced relation to the body sill web, an inwardly extending upper leg underlying the body sill upper leg, and an outwardly extending lower leg underlying the body sill lower leg, shims between said body sill legs and their respective underlying chassis sill legs, and bolts passing through said shims and clamping the body and chassis sills together.

9. In a vehicle construction, a chassis sill member of inwardly presenting channel section, a body sill member of Z-section having a vertical web, the upper leg of said Z-section overlying and removably bolted to the upper leg of said channel section, and a chassis sill reinforcement member extending outwardly from the channel section web and underlying the lower leg of said Z-section, said reinforcement member being welded to the chassis sill and removably bolted to said Z-section lower leg.

10. In a split-type unit body-frame construction for an automotive vehicle, a chassis part and a body part, each of said parts having a sill-forming vertical wall terminating at its upper and lower extremities in respective in-turned and out-turned horizontal legs, said vertical walls being horizontally spaced from each other and inboard from the adjacent side plane of the vehicle, the upper and lower legs of the body part overlying and removably clamped to the respective upper and lower legs of the chassis part, and a floor for said body part overlying and integrally associated with said upper leg thereof.

RUSSELL G. HEYL, JR.

REFERENCES CITED

The following references are of record in the file of this patent:

UNITED STATES PATENTS

| Number | Name | Date |
| --- | --- | --- |
| 2,102,402 | Zeder | Dec. 14, 1937 |
| 2,164,098 | Tjaarda | June 27, 1939 |
| 2,242,269 | Siebler | May 20, 1941 |
| 2,362,077 | Ledwinka et al. | Nov. 7, 1944 |